United States Patent
Hensley

(10) Patent No.: US 6,915,420 B2
(45) Date of Patent: Jul. 5, 2005

(54) METHOD FOR CREATING AND PROTECTING A BACK-UP OPERATING SYSTEM WITHIN EXISTING STORAGE THAT IS NOT HIDDEN DURING OPERATION

(76) Inventor: John Alan Hensley, 12421 Hardee Rd., Raleigh, NC (US) 27614-9234

( * ) Notice: Subject to any disclaimer, the term of this patent is extended or adjusted under 35 U.S.C. 154(b) by 249 days.

(21) Appl. No.: 10/337,114

(22) Filed: Jan. 6, 2003

(65) Prior Publication Data

US 2004/0133790 A1 Jul. 8, 2004

(51) Int. Cl.$^7$ ............................................. G06F 15/177
(52) U.S. Cl. ................................................ 713/2; 713/1
(58) Field of Search .............................. 713/1, 2, 100; 707/200, 204

(56) References Cited

U.S. PATENT DOCUMENTS

| | | |
|---|---|---|
| 4,590,557 A | 5/1986 | Lillie |
| 4,626,986 A | 12/1986 | Mori |
| 4,663,707 A | 5/1987 | Dawson |
| 5,497,492 A | 3/1996 | Zbikowski et al. |
| 5,905,888 A | 5/1999 | Jones et al. |
| 5,933,631 A | 8/1999 | Mealey et al. |
| 5,974,517 A | 10/1999 | Gaudet |
| 5,987,565 A | 11/1999 | Gavaskar |
| 5,991,542 A | 11/1999 | Han et al. |
| 6,032,161 A | 2/2000 | Fuller |
| 6,195,695 B1 | 2/2001 | Cheston et al. |
| 6,230,285 B1 | 5/2001 | Sadowsky et al. |
| 6,317,845 B1 * | 11/2001 | Meyer et al. .................. 714/23 |
| 6,377,958 B1 | 4/2002 | Orcutt |
| 6,381,694 B1 | 4/2002 | Yen |
| 6,401,183 B1 | 6/2002 | Rafizadeh |
| 6,430,663 B1 | 8/2002 | Ding |
| 2003/0012114 A1 * | 1/2003 | Larvoire et al. ............. 369/100 |

* cited by examiner

*Primary Examiner*—Lynne H. Browne
*Assistant Examiner*—Paul Yanchus, III
(74) *Attorney, Agent, or Firm*—Coats & Bennett, PLLC

(57) ABSTRACT

An emergency boot directory, containing a back-up copy of a primary operating system, is maintained in a protected, hidden subdirectory hierarchy during normal computer operations. A bootable media, which may be a removable media, contains bootstrap code operative to load and run the back-up operating system, if the primary operating system fails to boot and run. A file system filter driver hides and protects the emergency boot directory by intercepting file or data access and directory entry enumeration requests. The filter fails access requests directed to the emergency boot directory, and edits the results of enumeration requests to remove references to the emergency boot directory. The protected, hidden emergency boot directory can be located and maintained within an existing main storage area and does not depend on hidden attributes of secondary storage areas such as separate disk partitions or file systems.

28 Claims, 4 Drawing Sheets

METHOD FOR CREATING AND PROTECTING A BACK-UP OPERATING SYSTEM WITHIN EXISTING STORAGE THAT IS NOT HIDDEN DURING OPERATION

BACKGROUND OF THE INVENTION

The present invention relates generally to the field of computers, and specifically to a method of creating and maintaining an emergency boot directory containing a back-up operating system, within an existing main storage area, where the directory is hidden from the user and applications during normal use.

Modern personal computers have become complex, and may include a wide variety of peripheral devices and network interfaces. These devices may connect to the computer via a variety of standard interfaces, including the RS-232 Serial Port, Universal Serial Bus (USB), IEEE 1394 (also known as FireWire or i.Link), SCSI (Small Computer System Interface), PCMCIA (Personal Computer Memory Card International Association), and various network interfaces such as Token Ring, Ethernet, Bluetooth, IEEE 802.11, or the like. Most of these interfaces require a fully configured and running operating system to provide access to the attached device(s) and/or network(s). That is, they are not recognized by the computer ROMBIOS as boot devices, and additionally are not natively supported as boot or system devices by the operating system. As such, data storage devices attached to the computer via these interfaces are a poor choice for use as backup devices for critical system files needed in the event of a computer crash, such as may be caused by a hard drive malfunction, virus infection or other problem that keeps the computer operating system (OS) from successfully running and providing access the to backup device.

Current disaster recovery methods that deal with restoring unbootable computer systems running a modern operating system—such as Windows NT, 2000, or XP—either require a re-installation of the original operating system on the normal computer system hard drive, or else providing a secondary, legacy-based operating system, such as a prior version of Windows, containing hardware specific device drivers, to provide access to an external storage device. Both approaches present significant deficiencies. Re-installing the operating system is a daunting task for most users, and will often result in the loss of at least the data generated and stored on the system disk since the last back-up. Using a legacy-based operating system—such as MS-DOS and those versions of Microsoft Windows that were derived from MS-DOS, such as Windows 3x/9x/ME—for booting a damaged or virus-infected computer requires a separate license, requires a variety of hardware-specific, real-mode device drivers, and does not include native support for modern file systems, such as NTFS file system introduced with the Windows NT operating system in the early 1990s.

In recent years the available space on computer hard drives has increased significantly and continues to double approximately every eighteen months. This very large disk capacity makes storage of a back-up copy of the operating system on an internal hard drive a feasible solution. Such an approach presents the significant advantages that no separate license fees are due to use the back-up operating system, no legacy real-mode device drivers must be maintained, and all of the files systems on a typical computer are natively supported, as the back-up operating system is a copy of the computer's primary operating system. Furthermore, if the computer's bootstrap code is appropriately configured to boot the back-up copy directly (or alternatively, to copy the back-up copy to the normal OS system directories and boot from there), in the event of a failure of the primary operating system to boot and run, the user is spared the need to re-install the operating system.

Two recent trends have made such on-disk storage of a back-up operating system risky. First, with the growth of the Internet, computer users have been subjected a dramatic increase in the number of and variety of malicious viruses, many of which search a computer's internal drives or operating system files and infect or otherwise alter all that they find. Second, with increasing high-bandwidth Internet availability, such as via television cable modems, DSL links, and the like, many computers maintain a "persistent" connection to the Internet. That is, they are always connected, dramatically increasing their exposure to infection by malicious viruses. The low utilization of firewalls and anti-virus software, and many users' poor virus profile update habits, further increase the risk of a virus infection that may seek out and alter on-disk operating system files.

Maintaining back-up operating system files on an internal disk in such a manner that the back-up copy is hidden, both from the user and from applications running on the computer, is well known in the art. These prior art methods hide back-up copies of the operating system by placing it in separate, hidden disk partitions, or in different file systems. Keeping a back-up copy of the OS in a separate partition or file system, however, presents several disadvantages. In a normal end user personal computer configuration, there is usually one hard drive. That drive typically includes a single partition that uses all available hard disk space, and that partition typically contains a single file system that uses all available space within the partition. Hiding files through either a hidden partition or a separate file system presents several difficulties in such a situation. To include a separate file system, for example, requires either adding an additional mass storage device for the new file system or re-sizing the original file system layout to provide space for the new file system within an existing partition. Such a re-sizing operation typically requires specialized software.

Similarly, to add a new partition in an existing end user configuration to store a back-up copy of the operating system, software is necessary to either re-size an existing disk partition or create a new one. Re-sizing partitions is a very precarious endeavor that can easily cause complete loss of existing data on the hard disk. As such, re-sizing normally requires the end user to perform a complete backup of the hard disk before the partitions are re-sized, so the existing data is protected. Separate software may be necessary to relocate existing files on the hard drive, to clear contiguous free space for a second partition or file system. The partitions or file systems may need to be re-sized again when operating system upgrades, or service packs, are installed that increase the operating system file set (and hence the space required to store a back-up copy).

Furthermore, to select the partition from which to boot, many prior art systems must alter or replace the master boot record, such as to pause booting to request partition selection instructions from the user, or to examine the success record of prior boot attempts and select or copy partitions or file systems automatically. Alteration of the master boot record causes compatibility problems with hard disk utilities such as DiskManager, which place their own code in the master boot record to allow the use of hard drives with geometries that are unsupported by the computer's ROMBIOS. Making modifications to a master boot record will also trigger antivirus programs that monitor writes to the master boot record. Finally, software must be provided to remove the hidden partition or file system and restore the size of the original partition or file system when the end user wishes to remove the operating system, an operation that would also require a full backup of the hard disk as a safety precaution before the resizing operation.

Hence, a need exists in the art for a method of maintaining a back-up copy of the operating system and other recovery software, in a secured and hidden location within an existing main storage area, so that it would no longer be necessary to alter the existing main storage in order to create and maintain a separate secondary storage area, as the prior art requires for most end user computer configurations.

SUMMARY OF THE INVENTION

The present invention relates to a method of creating and maintaining a back-up operating system, within an existing storage area, that is hidden from the user and applications during normal use, and does not depend on hidden disk partitions or separate file systems. The primary operating system files are copied to a new directory hierarchy, to create back-up operating system files. Configuration data in the back-up operating system files is altered to reflect the new directory hierarchy location on the disk. A new file system filter driver is operative to intercept file or data access and directory entry enumeration requests directed to the back-up operating system files, and to fail the requests or edit the data returned, so as to hide the back-up operating system files from the requesting application. This file system filter driver is loaded during the operating system boot sequence. A bootable removable disk is prepared, containing bootstrap code operative to boot and run the computer using the back-up operating system files. The bootable disk may be used to boot and run the computer upon a failure of the primary operating system to boot and run.

DETAILED DESCRIPTION OF THE INVENTION

The present invention relates to a method of creating and maintaining a protected, hidden, emergency boot directory containing a back-up copy of a computer operating system. The emergency boot directory may be used to boot and run the computer in the event of a failure of the primary operating system to boot or run, by booting the computer using a bootable, removable medium (such as a floppy disk or CD-ROM/DVD disk) that is configured to boot and run the back-up operating system.

Figure 1:
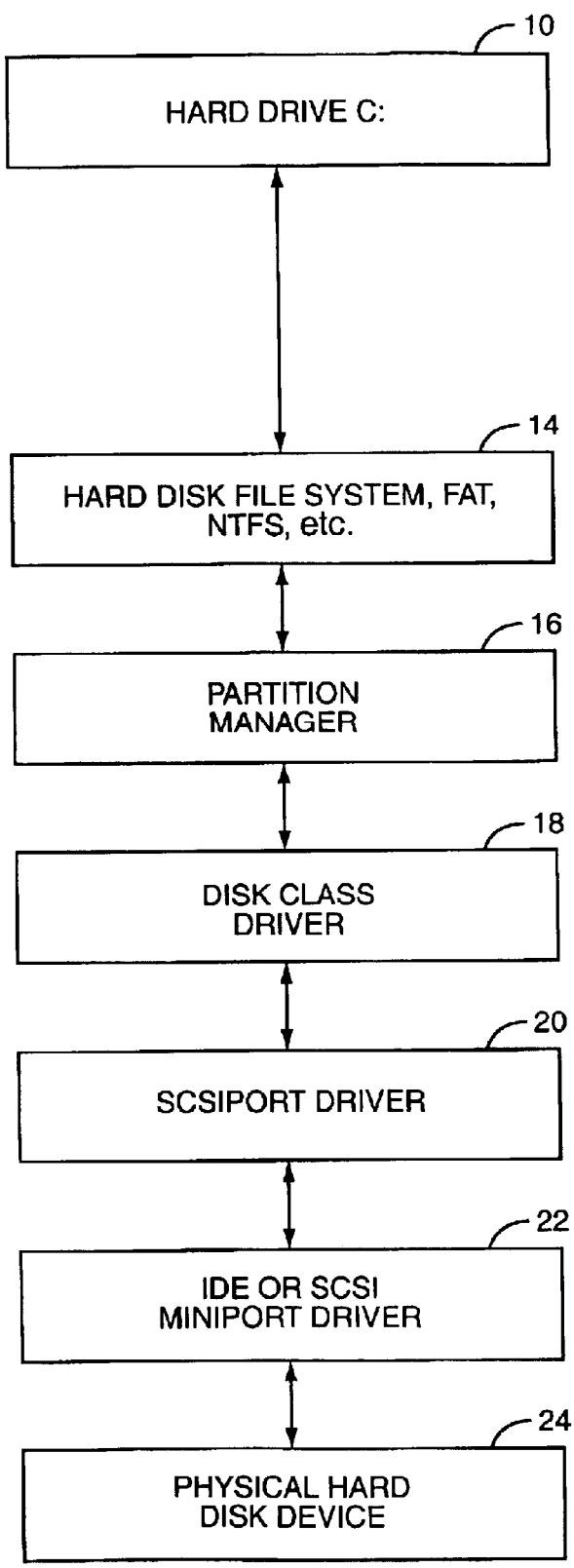
FIG. 1 is a diagram of prior art computer file system hierarchical drivers.

Modern operating systems provide a layered hierarchy of support for, and access to, computer storage devices, such as disk drives, as depicted in FIG. 1. The various layers of device and file system drivers are typically loaded into memory and initialized during a system initialization, or boot, procedure. The layered approach allows the operating system, and other programs running within the operating system environment, to access files stored on the underlying storage media without specific knowledge of the underlying file system or hardware protocols. The use of a layered driver model in modern operating systems enhances the portability of programs, allows programs to execute on a wide range of hardware configurations, and allows for the incorporation of new storage technology into existing computers without the need to update all applications to take advantage of the new hardware. As discussed more fully herein, the layered driver model also makes it possible to control access to, and change the appearance of, the contents of a computer storage device, by providing appropriate filters and drivers in the layer hierarchy.

FIG. 1 depicts a functional hierarchy of typical prior art system components and device drivers that translate operating system views of storage devices (i.e., the C: drive) to the corresponding physical drive device. The operating system provides a standard interface 10 to storage devices for use by application programs, such as the hard drive C:. Additional drive interfaces that may exist in a given computer configuration, such as CD-ROM/DVD drives, floppy drives, tape units, and the like are not shown. The operating system standard drive interface 10 allows programs running within the operating system environment to access files on the underlying storage devices. The disk file system driver 14 provides services for accessing individual files within the file system on the disk drive. The partition manager 16 provides access to data within each of a plurality of partitions that may exist on the hard disk. The disk class driver 18 provides a means of accessing features that are specific to the underlying disk drive. The SCSIport driver 20 converts I/O requests into a standard format that is understood by the underlying IDE or SCSI miniport driver 22. The miniport driver 22 understands the controller on which the physical disk drive 24 is attached, and processes I/O requests from the SCSIport driver 20. Finally, the physical hard disk drive device 24 reads data from and writes data to nonvolatile magnetic storage media housed in the disk drive device.

Figure 2:
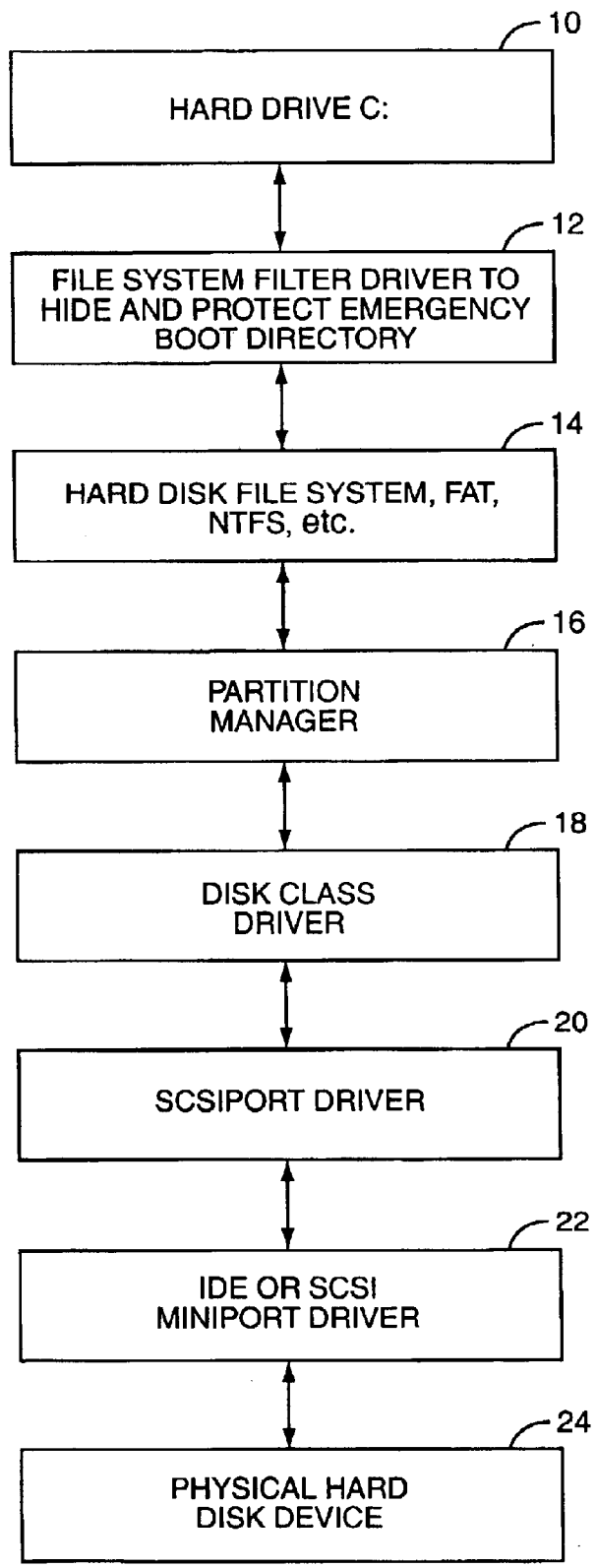
FIG. 2 is a diagram of a computer file system drivers hierarchy that includes a file system filter driver operative to hide and protect an emergency boot directory, according to the present invention.

FIG. 2 depicts the functional hierarchy of system components and device drivers for a disk drive including a file system filter driver 12 to protect and hide an emergency boot directory according to one embodiment of the present invention. As used herein, the terms "file system filter" and "file system filter driver" both refer to the emergency boot directory-hiding software module of the present invention. The file system filter driver 12 is interposed in the file system hierarchy between the standard file system interface 10 and the file system driver 14. The file system filter driver 12 intercepts all requests going the file system for the read-write hard drive 24, and hides the presence of the files and subdirectories that make up the emergency boot directory, which contains a back-up copy of the operating system files. Other file system components associated with the read-write hard disk drive 24—such as the operating system interface 10, file system driver 14, partition manager 16, and disk class driver 18, SCSIport driver 20 and miniport driver 22—function in a manner directly analogous as that described above with reference to FIG. 1.

Figure 3:
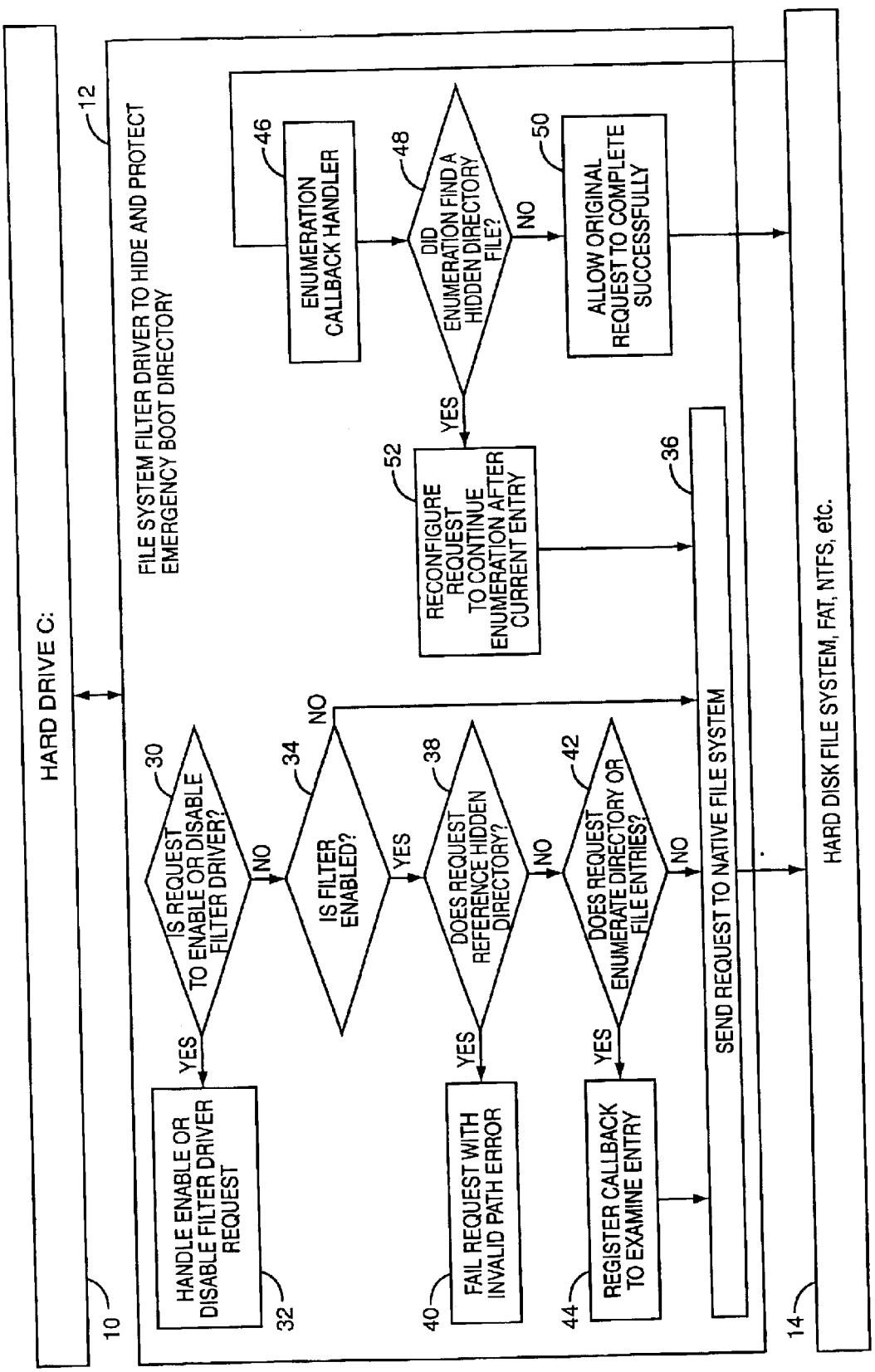
FIG. 3 is a flow diagram representation of a file system filter driver.

FIG. 3 is a flow chart depicting the operation of the file system filter 12. The file system filter 12 processes intercepted file system requests to hide the presence of the files and subdirectories that make up the emergency boot directory. Requests directed to the file system for the hard drive 24 are intercepted and examined by the file system filter 12. Note that the file system filter 12 intercepts all disk access requests, including sector level accesses, as well as the file-oriented requests provided by the file system. The file system filter 12 first examines the request to see if it is a request to enable or disable request filtering (block 30). By allowing the file system filter 12 to be disabled, it is possible for an application program to view and update the normally hidden files and directory entries on the underlying hard drive. If the file system filter 12 receives an enable or disable request, the request examined to verify any security requirement, and the file system filter 12 enters the requested state (block 32). If the request is not a disable/enable request, the file system filter 12 will determine its current filtering state and decide whether the request requires further processing (block 34).

If the file system filter 12 is disabled, the request is sent to the underlying file system driver 14 (block 36) for normal processing. If the file system filter 12 is enabled, the intercepted request is examined to determine if it is a file or data access request referencing a file or directory in the emergency boot directory hierarchy, or a disk sector utilized by such file or directory (block 38). If so, the request is failed with an appropriate error code to signify the specified file or directory location does not exist (block 40). If the request is not a file or data access request referencing a file, directory or sector of the emergency boot directory hierarchy, it is examined to determine if the request is to enumerate file or directory entries (block 42). If not, the request is passed to the file system driver 14 for normal processing (block 36).

If an enumeration request is detected, a callback function entry point is registered (block 44), so that the registered function will be called by the underlying drivers as each individual directory entry is enumerated. Finally, the request is passed on to the native file system (block 36). As the underlying file system driver 14 enumerates directory entries, it will call the enumeration callback handler 46 for each entry it finds. The enumerated entry will be examined to ascertain if it references the emergency boot directory hierarchy (block 48). If the enumerated item does not reference the emergency boot directory hierarchy the original request will be allowed to complete successfully (block 50). If the enumerated entry references the emergency boot directory, the original request is reconfigured to cause the enumeration to continue immediately after the current entry (block 52), and thereby prevent information about the entry from being seen by the initiator of the original request.

Figure 4:
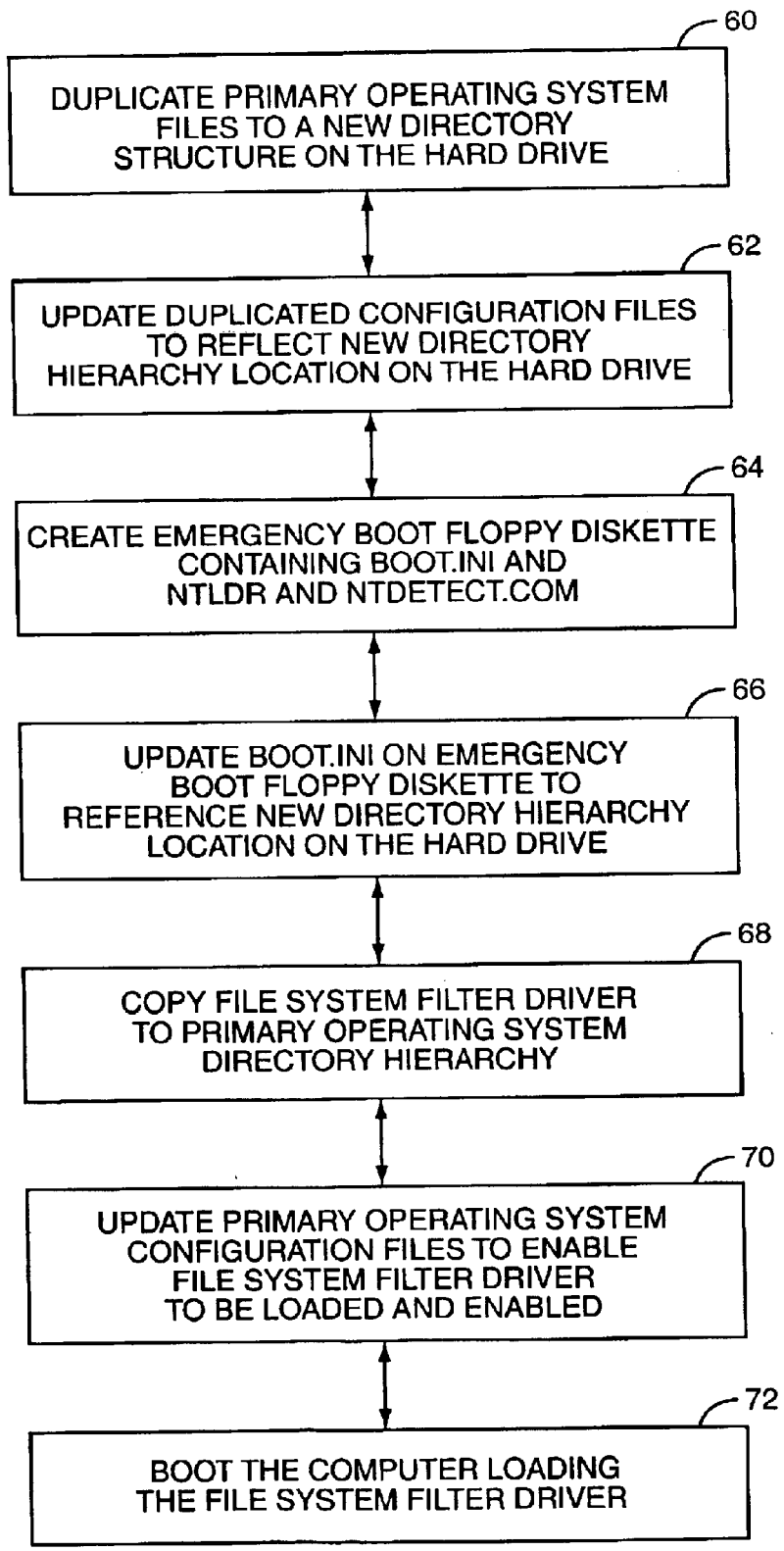
FIG. 4 is a flow diagram of a method by which the protected, hidden, emergency boot directory of the present invention may be implemented.

FIG. 4 is a flow chart depicting a method of using the existing files on a modern computer system to create a new operating system configuration located in an emergency boot directory, creating a bootable floppy diskette or CD-ROM/DVD disk to allow booting the computer using the operating system in the emergency boot directory and installing a file system filter driver to hide and protect the emergency boot directory hierarchy during normal use.

First a copy is made of the primary operating system executable and configuration files by duplicating each of the original operating system files from the computer hard drive into a new emergency boot directory hierarchy (step 60). The new directory hierarchy is preferably located in the existing main storage area. In particular, the new directory hierarchy is preferably located on the same computer hard drive and in the same partition as the primary operating system files. However, the present invention is not limited to this configuration. The emergency boot directory could be located on the same hard disk, within a different, non-hidden partition. Alternatively, the emergency boot directory could be located on a different disk than the primary operating system. The directory is preferably located on a device that is natively supported as a boot device by the operating system (e.g., for the Microsoft Windows NT, 2000, or XP operating systems, either a drive that is accessible in real-mode using the computer's ROMBIOS interface, or a system drive that is accessible using a SCSI miniport driver that has been placed in the root directory of the boot drive). However, this is not required, so long as the computer has the ability to boot so as to run from whatever drive or device the directory is located on. For example, pending patent application serial no. [TBD], by the same inventor as the present invention, and which is incorporated herein by reference, discloses a system and method to boot a computer to run from a normally unsupported system device.

Next, the operating system configuration files that were copied to the new emergency boot directory hierarchy are modified, to replace any references to the original operating system directory structure with references to the new emergency boot directory hierarchy (block 62).

A bootable removable media, such as floppy diskette, is created containing copies of the original operating system bootstrap files such as BOOT.INI, NTLOADER and NTDETECT.COM (block 64). Alternatively, the bootable removable media could comprise a bootable CD-ROM or DVD disk, such as a CD-ROM that conforms to the "El Torito" format. The El Torito specification, published by Phoenix Technologies of Irvine Calif. and IBM of BocaRaton Fla., available at http://www.phoenix.com/resources/specs-cdrom.pdf and incorporated herein by reference, allows for one or more bootable hard or floppy disk "image" files on a CD-ROM, and concomitant alterations to the computer's ROMBIOS to support the CD-ROM as a bootable device. In general, "bootable removable media" includes any removable media from which the computer may be initially booted.

The bootstrap configuration file BOOT.INI copied to the bootable removable media is modified to replace any references to the primary operating system directory structure with references to the new emergency boot directory (block 66). This file may be modified after it is copied to a floppy or writeable CD-ROM/DVD (prior to closing the media session in the latter case), or may be modified prior to being placed on the bootable removable media, as may be necessary in the case of true write-once media.

To prevent programs running under the primary operating system configuration from modifying the files in the new emergency boot directory hierarchy, a file system filter driver 12 (see FIGS. 2, 3) is provided and copied to the primary operating system subdirectory hierarchy (block 68). The primary operating system configuration files are modified to facilitate the loading of the file system filter driver 12 (block 70), and the computer is rebooted using the primary operating system files (block 72), so that the file system filter driver 12 is loaded and operative to hide the emergency boot directory structure.

The present invention provides significant benefits compared to prior art solutions of maintaining a back-up copy of an operating system in an existing configuration. The present invention provides a secondary means of booting a typical modern computer system, with a single hard disk device having a single primary storage area that utilizes all available hard disk space and contains a primary operating system, by creating back-up copy of the primary operating system files that can be used to boot the computer when the primary operating system has become non-bootable or unstable. The present invention allows the back-up operating system files to be located within the primary storage area. Alternatively, the back-up operating system files may be located within any storage area that is supported as a system drive by the computer (either natively or as modified according to the invention disclosed in the above-incorporated patent application).

The present invention provides security for the back-up operating system files that is independent of the security features of the existing primary operating system, so that modifications cannot be made to the back-up operating system files regardless of the security credentials of an active user or process so attempting. The present invention thus hides the presence of the back-up operating system files from all end users and user level processes, regardless of the security credentials of the active user or user process.

According to the present invention, no modification of any file system layouts or partition layouts currently in use on the hard disk is required. The back-up operating system files are created while operating entirely within the normal environment provided by the primary operating system, and no rebooting under a different operating system is required. Furthermore, no existing files must be modified (with the exception of minor modifications to the primary operating system files, to load the file system filter driver 12 upon booting) or relocated, hence there is no need for the end user to perform a backup of existing files as insurance against such modification or relocation leaving the system in an unstable or unbootable state. In addition, the present invention does not require any modification to firmware already in use by the existing computer configuration, or to the existing bootstrap code in the hard drive master boot record or partition boot record. As there are no dependencies on the layout of the existing hard drive partitions or file systems, newer hard drive partitioning schemes and file systems can be automatically supported.

According to the present invention, the back-up operating system files can be used to boot the computer if the existing bootstrap code within the master boot record or partition boot record becomes unusable, such as due to corruption. Also, the back-up operating system files may easily be updated after the primary operating system has been upgraded to a newer version consisting of a larger file set, without the need to reserve storage space in advance.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of creating and maintaining a hidden back-up operating system, comprising:
    copying a computer's primary operating system files to a location within an existing storage area that is not hidden during operation, to create back-up operating system files;
    altering configuration data in said back-up operating system files so as to reflect their location in said storage area;
    providing a file system filter driver operative to intercept access and enumeration requests directed to said back-up operating system files, and to fail said requests or edit the data returned, so as to hide said back-up operating system files from the requesting application; and
    booting said computer so as to load said file system filter driver.

2. The method of claim 1 wherein said back-up operating system files are organized in at least one subdirectory, and said file system filter is operative to hide said subdirectory.

3. The method of claim 1 wherein said back-up operating system files are on the same disk as said primary operating system files.

4. The method of claim 2 wherein said back-up operating system files are in the same partition as said primary operating system files.

5. The method of claim 2 wherein said back-up operating system files are in a different partition than said primary operating system files.

6. The method of claim 1 wherein said back-up operating system files are on a different disk than said primary operating system files.

7. The method of claim 1 wherein said file system filter is operative to fail access requests directed to said back-up operating system files.

8. The method of claim 7 wherein said file system filter fails said access requests by returning an error code indicating the requested file was not found.

9. The method of claim 1 wherein said file system filter is operative to edit the results of enumeration requests so as to remove from said results any entry associated with said back-up operating system files, prior to returning said results to the requesting application.

10. The method of claim 9 wherein said file system filter registers a callback function for enumeration requests, such that as each directory entry is enumerated by underlying file system drivers, said drivers call said function and return said directory entry.

11. The method of claim 10 wherein said file system filter further includes a callback handler operative to examine each said directory entry returned, and if said directory entry is associated with one of said back-up operating system files or directories, to reconfigure said enumeration request to cause the enumeration to continue immediately following the returned directory entry, so as to delete all said back-up operating system files from the enumeration request results.

12. The method of claim 1 wherein booting said computer so as to load said file system filter comprises:
    altering said primary operating system configuration files to mark said file system filter as a boot driver; and
    booting said computer with said primary operating system.

13. The method of claim 1 further comprising preparing a bootable disk containing bootstrap code operative to boot and run the computer using said back-up operating system files.

14. The method of claim 13 wherein said bootable disk is removable.

15. The method of claim 14 further comprising, in the event of a failure in booting and running the computer using said primary operating system files, booting the computer using said bootable removable disk.

16. The method of claim 1 wherein said file system filter is operative to intercept and fail any request to read or modify data within said back-up operating system files.

17. The method of claim 16 wherein said requests to read or modify data includes sector level access requests.

18. A method of disaster recovery for a computer having a primary operating system and a hard disk drive and a removable media drive, comprising:

prior to a failure to boot and run the computer,
copying the primary operating system files to a non-hidden partition of said disk, to create back-up operating system files;
altering said primary operating system files to load, as part of a boot sequence, a file system filter operative to intercept access and enumeration requests directed to said back-up operating system files, and to fail said requests or edit the data returned, so as to hide said back-up operating system files from the requesting application; and
preparing a bootable medium operative to boot and run using said back-up operating system files; and following loss of use of said system drive,
booting the computer using said bootable medium.

19. The method of claim 18 further comprising updating said back-up operating system files to reflect their directory hierarchy location.

20. The method of claim 18 wherein said bootable medium is removable.

21. The method of claim 20 wherein said bootable removable medium is selected from the group including floppy disks, CD-ROM disks, and DVD disks.

22. The method of claim 21 wherein said bootable removable medium is a CD-ROM or DVD disk that conforms to the El Torito format specification.

23. The method of claim 18 wherein said file system filter is operative to fail access requests directed to said back-up operating system files.

24. The method of claim 23 wherein said access requests include sector level access requests.

25. The method of claim 23 wherein said file system filter fails said access requests by returning an error code indicating the requested data was not found.

26. The method of claim 18 wherein said file system filter is operative to edit the results of enumeration requests so as to remove from said results any entry associated with said back-up operating system files, prior to returning said results to the requesting application.

27. The method of claim 26 wherein said file system filter registers a callback function for enumeration requests, such that as each directory entry is enumerated by underlying file system drivers, said drivers call said function and return said directory entry.

28. The method of claim 27 wherein said file system filter further includes a callback handler operative to examine each said directory entry returned, and if said directory entry is associated with one of said back-up operating system files or directories, to reconfigure said enumeration request to cause the enumeration to continue immediately following the returned directory entry, so as to delete all said back-up operating system files from the enumeration request results.

* * * * *